Dec. 16, 1969    C. NOACK    3,483,680

SELF-PROPELLED HARVESTER

Filed Dec. 4, 1967    2 Sheets-Sheet 1

INVENTOR.
CHRISTIAN NOACK
BY
Karl G. Ross
ATTORNEY

Dec. 16, 1969  C. NOACK  3,483,680
SELF-PROPELLED HARVESTER
Filed Dec. 4, 1967  2 Sheets-Sheet 2
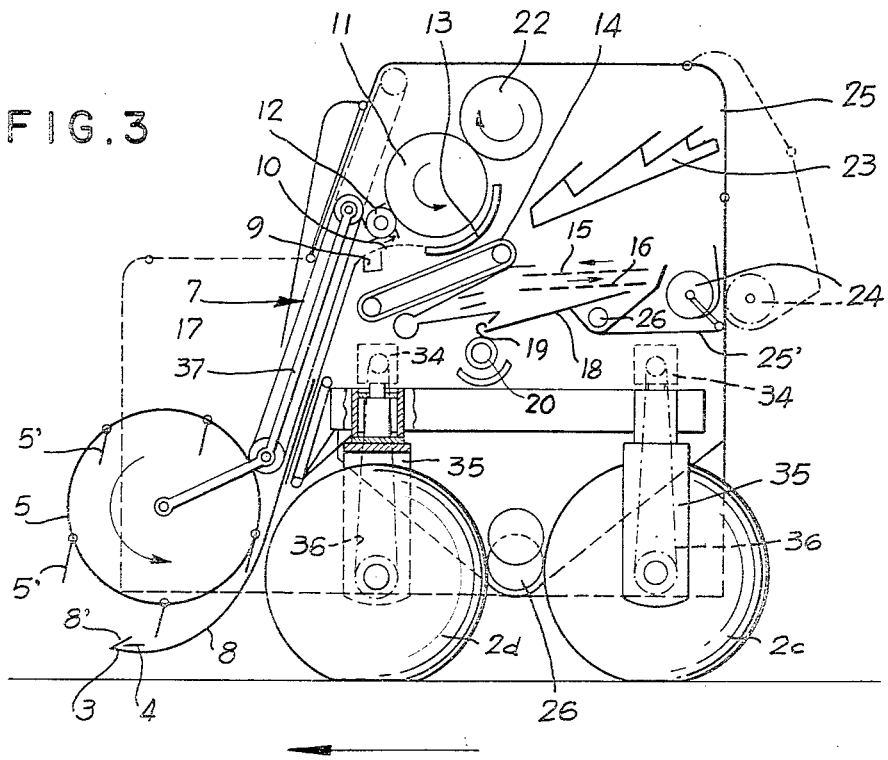
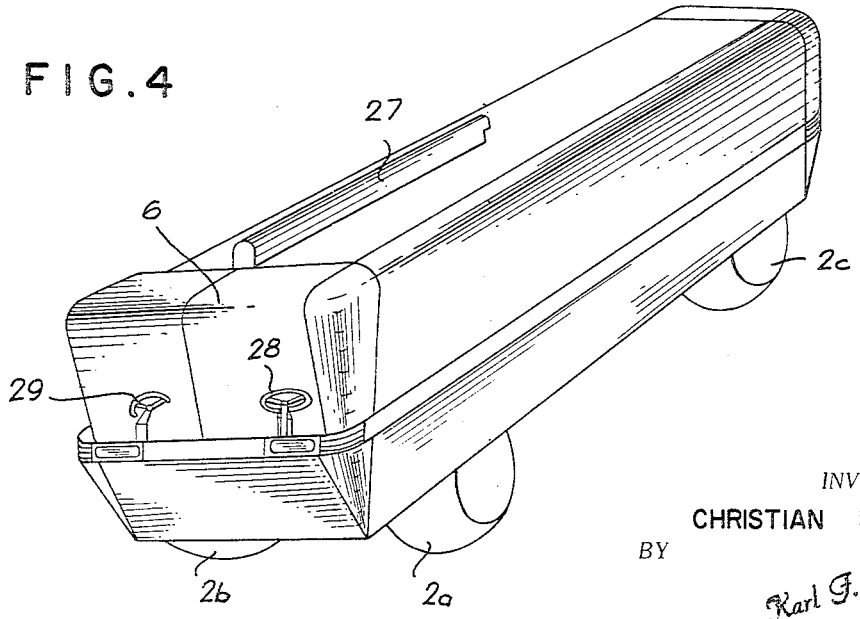
INVENTOR.
CHRISTIAN NOACK
BY
Karl G. Ross
ATTORNEY United States Patent Office 3,483,680
Patented Dec. 16, 1969

3,483,680
SELF-PROPELLED HARVESTER
Christian Noack, Guttau, Kreis Bautzen, Germany, assignor to VEB Rombinat Fortschritt, Landmaschinen, Neustadt, Saxony, Germany, a corporation of Germany
Filed Dec. 4, 1967, Ser. No. 687,923
Int. Cl. A01d *41/02, 57/00*
U.S. Cl. 56—21                                    10 Claims

ABSTRACT OF THE DISCLOSURE

To facilitate road travel of a self-propelled combine harvester designed to cut a swath wider than a vehicular lane, the generally rectangular harvester chassis is provided with a driver's cab overlooking one of its minor sides as well as a major side for steering the harvester with the aid of an adjustable wheel base either parallel to the major sides (for highway travel) or transversely thereto (for work in the field), the aforementioned major side being equipped with one or more cutter bars extending substantially over the entire length of the chassis and delivering cuttings to a substantially coextensive thresher unit and associated equipment including a storage bin.

My present invention relates to a combine harvester of the self-propelled type.

In agricultural machinery of this character it has heretofore been difficult to accommodate a mower assembly adapted to cut crops in a wide swath, substantially in excess of the width of a vehicular lane on a public highway along with means for effectively processing the cuttings coming from the mowing attachment. Thus, prior wide-swath harvesters were usually equipped with multipart assemblies which after use had to be dismantled and broken up into sections to be stored aboard the vehicle for subsequent remounting when another crop was to be processed. Furthermore, such outrigger-type mowers did not operate satisfactorily because the cuttings delivered by the attachment had to be channeled into a considerably narrower processing unit including threshing, winnowing and storage means; this funneling frequently led to congestion of the cuttings on their way to or within the several processing stages.

The general object of my invention is to provide an improved combine harvester which avoids the aforestated drawbacks and, while being capable of mowing and processing the cuttings from a strip of field considerably wider than a vehicular lane, can be driven along public highways as well as country roads substantially without any interference with other vehicular traffic.

This object is realized, in accordance with the present invention, by the provision of a combine harvester whose generally rectangular chassis carries a driver's cab overlooking one of the minor sides of the rectangle as well as a major side thereof, the latter being equipped with a mowing attachment extending over the greater part of the edge; an adjustable wheel base, which may include four individually swivelable wheels each swingable through an arc of more than 90° as more fully described in my commonly assigned application Ser. No. 687,922 of even date, allows the vehicle to be driven either longitudinally for road travel or transversely for working in the field, the driver's cab being equipped with a steering-wheel assembly for controlling the orientable traction wheels of the vehicle in either direction of locomotion.

With the arrangement described, the threshing and winnowing stages receiving the cuttings (mixture of grain and straw) from the cutter-bar assembly may each be substantially coextensive with the mowing attachment in longitudinal direction of the chassis so that no funneling of the cuttings from the mower to the subsequent processing units is necessary and no congestion is likely to occur. On the contrary, the large extent of the threshing and winnowing means made possible by the arrangement according to my invention allows the crop material to be spread out into a relatively thin layer which can be economically processed with a modest energy input. The grains or kernels winnowed from the crop material are then collected in a storage bin, disposed centrally of the chassis at a low level, whereas the straw or chaff can be carried off and deposited in a windrow behind the trailing edge of the vehicle, i.e. the major edge of the rectangle remote from the cutter bar or bars of the mower. The storage bin may be eventually unloaded with the aid of a discharge mechanism advantageously including a screw conveyor extending upwardly at the driver's cab preferably along the rear wall thereof, and terminating in a swingable horizontal extension above the cab whereby the grain may be conveniently ejected into a receptacle or another vehicle alongside the harvester.

Although for purposes of the present improvement the exact nature of the mechanism for adjusting the wheel base is immaterial, I prefer to utilize the system described in my aforementioned copending application wherein the front wheels of the vehicle (as viewed in the direction of highway travel) are orientable for steering along the road, whereas during field work both the front wheels and the rear wheels are coplanar and perpendicular to the longitudinal axis of the chassis except during yawing motion when the wheels of the pair on the inside of the curve are toed outwardly to cause veering of the vehicle in the corresponding direction. The driver will thus be able to steer the vehicle along the highway in the safest and most efficient manner, i.e. by controlling the position of the dirigible front wheels.

The invention will be described in greater detail with reference to the accompanying drawing in which:

FIG. 3 is a cross-sectional view taken on the line III—III of FIG. 2; and

FIG. 4 is a perspective front view of the harvester.

Figure 1:
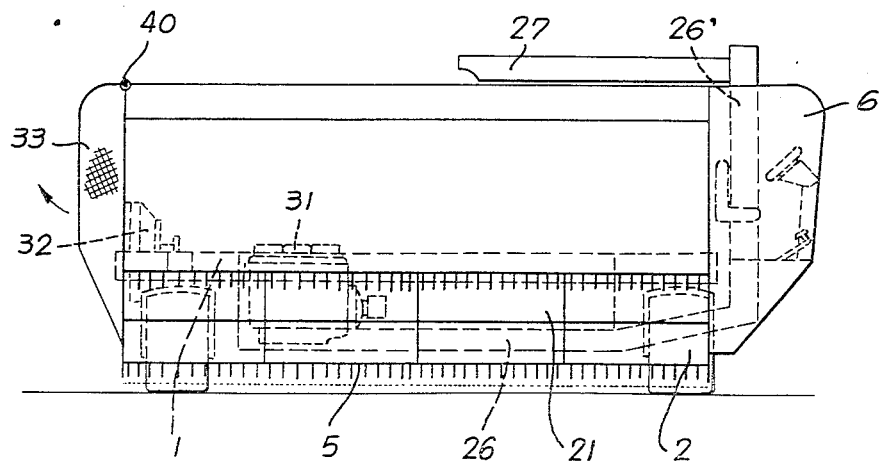
FIG. 1 is a side-elevational view of a combine harvester embodying my invention.
Figure 2:
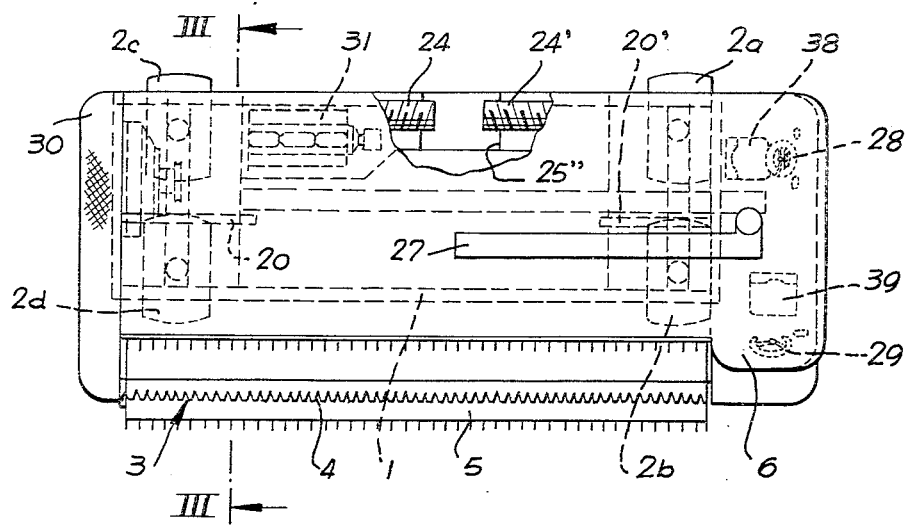
FIG. 2 is a top plan view of the harvester shown in FIG. 1.

The vehicle shown in the drawing comprises a generally rectangular chassis including a frame 1 in which four traction wheels 2a, 2b, 2c and 2d are swingable about respective vertical axes. Each wheel may be driven by an individual motor 34, preferably of the reversible hydrostatic type, rigid with a fork 35 straddling the wheel and operatively connected with the wheel axis via a chain 36 and sprocket wheels not shown. The motors 34 are supplied with operating fluid from a common source 31, such as a pump driven by a gasoline engine or the like, via hydraulic valves controlled by a pair of steering wheels 28, 29 in a driver's cab 6 which overlooks one of the minor sides (i.e. the forward side for highway travel) and also an adjoining major edge of the rectangular chassis. Steering wheel 28, adjacent a driver's seat 38, serves for travel on the road, the traction wheels 2a–2d being then in the position illustrated in FIG. 4 with rear wheels 2c, 2d lying in parallel longitudinal planes and front wheels 2a, 2b being hydraulically orientable in response to a turning of steering wheel 28. Steering wheel 29 is disposed next to an alternate driver's seat 39 and, with the traction wheels occupying the transverse position shown in FIG. 2, serves to deflect either the left-hand wheels 2a, 2b or the right-hand wheels 2c, 2d from their coplanar position into generally diagonal positions to turn the vehicle to the left or to the right, respectively.

The major edge of the chassis overlooked by driver's cab 6 is fitted with a mowing attachment 3 including a reciprocable cutter bar 4 (or a plurality of such bars longitudinally aligned) extending from the rear of the vehicle to its front just behind the cab 6; a stationary cutter bar 8′ co-operating with the movable bar 4 is constituted by a set of teeth rigid with an upwardly curved guide plate 8 fixed to the frame 1. A reel 5 with depending tines or fingers 5′, designed to entrain the cuttings in the direction of the arrow in FIG. 3, is coextensive with the cutter bar 4 and, together with an adjoining elevator-type conveyor 7, is adjustably mounted on the guide plate 8. Thus, the axles of reel 5 and of the rollers of conveyor 7 are journaled in a common support 37 which may be raised or lowered along plate 5 according to the type of crop to be processed.

Elevator 7 carries the crop material past a trough 9, serving as a pebble trap, to a bar grate 10 whence a feed roller 12 delivers the cutting to a threshing basket 13 alongside a thresher drum 11. Another conveyor belt 14 receives the grains from the thresher stage 11, 13 and transports them to a winnowing stage including a pair of inversely movable sieves 15 and 16 along with a blower 17. A sloping bottom plate 18 directs the kernels through a slit 19 into a storage bin 21 disposed at a low level centrally of the frame 1; the ends of the slit 19 register with respective screws 20, 20′ of opposite pitch which, rotating continuously, help channel the grain into the bin 21. Whereas the bin 21 must be limited in length in order to fit between the traction wheels 2a–2d, the other elements heretofore described (such as drum 11, wheel 13, conveyor 14 and sieves 15, 16) can all extend over substantially the full length of the chassis.

The straw and chaff separated from the grain is delivered by a drum 22 to a stepped agitator 23 which also extends substantially over the full length of the chassis and can be quite narrow in the transverse dimension in view of the low height of the spread-out straw layer. The straw advancing beyond the agitator 23 drops into a pair of oppositely pitched screws 24 which in operation are swung outwardly, as illustrated in dot-dash lines in FIG. 3, on a pivotable wall portion 25 of the chassis. Through a central slot 25″ of the lower part 25′ of this swingable wall portion, the straw transported by the screws 24, 24′ is discharged into the open to form a windrow behind the vehicle advancing to the left in FIG. 3.

In order to unload the storage bin 1, a screw conveyor 26 extends within that bin and rises at 26′ along the back wall of cab 6 to the top of the vehicle where a swingable discharge arm, advantageously also in the form of a conveyor screw, directs the oncoming grains into a receptacle alongside the vehicle.

The rear of the vehicle as viewed in the direction of road travel, i.e. the side opposite cab 6, is provided with a perforated hood 33 serving for the cooling of the engine 31; for this purpose a fan 32 is disposed next to the hood 33 which can be swung upwardly about a hinge 40 to give access to the radiator and the engine. In view of the large surface of hood 33, its perforations may be relatively small.

I claim:

1. A self-propelled combine harvester comprising, in combination:
   a wheel-borne chassis of generally rectangular outline;
   a grain-storage bin carried by said chassis;
   threshing means carried by said chassis at a level above said bin;
   winnowing means carried by said chassis at a level above said bin at the output of said threshing means;
   mower means carried by said chassis along a major edge thereof and extending over the major part of the length of said chassis;
   conveyor means on said chassis for delivering cuttings from said mower means to said threshing means;
   a driver's cab on said chassis overlooking a minor side thereof and said major edge;
   propulsion means carried by said chassis; and
   driver-operated means in said cab for selectively controlling said propulsion means to drive said chassis in a direction generally transverse to said major edge during operation of said mower means and in a direction generaly parallel to said major edge upon deactivation of said mower means.

2. A harvester as defined in claim 1 wherein said mower means includes a cutter-bar assembly and a reel overlying said assembly, said reel being provided with tines for entraining said cuttings to said conveyor means.

3. A harvester as defined in claim 2 wherein said mower means further includes a rising guide surface behind said cutter-bar assembly and said reel, said conveyor means extending upwardly along said guide surface.

4. A harvester as defined in claim 3 wherein said conveyor means and said reel are provided with a common support adjustably mounted with reference to said guide surface.

5. A harvester as defined in claim 2 wherein said conveyor means comprises a belt of a width substantially equaling the extent of said cutter-bar assembly and said reel in the longitudinal direction of said chassis.

6. A harvester as defined in claim 1, further comprising discharge means for ejecting the contents of said bin, said discharge means including a screw conveyor extending upwardly at said cab and terminating in a swingable horizontal extension above said cab.

7. A harvester as defined in claim 1 wherein said winnowing means is provided with a straw ejector including a pair of aligned feed screws of opposite pitch working toward a common center and having a common axis parallel to said major edge.

8. A harvester as defined in claim 7 wherein said feed screws are provided with a swingable support for displacing same between a withdrawn position within the outline of said chassis and an operating position beyond the major edge of said chassis remote from said mower means.

9. A harvester as defined in claim 1 wherein said chassis is provided with a perforated hood extending over substantially the entire minor side thereof opposite said cab, said propulsion means including an engine disposed at a location remote from said cab for cooling by air aspirated through the perforations of said hood.

10. A harvester as defined in claim 9 wherein said engine is provided with a fan situated immediately behind said hood, the latter being swingably mounted on said chassis for giving access to said fan.

References Cited

UNITED STATES PATENTS 3,245,695  4/1966  Bernard _____ 56—228 XR

FOREIGN PATENTS 996,743  12/1951  France.
838,421  6/1960  Great Britain.

LOUIS G. MANCENE, Primary Examiner

JAMES A. OLIFF, Assistant Examiner

U.S. Cl. X.R.

56—228